(12) United States Patent
Lu et al.

(10) Patent No.: US 11,389,789 B2
(45) Date of Patent: Jul. 19, 2022

(54) VISIBLE LIGHT RESPONSIVE TITANIUM DIOXIDE NANOWIRE/METAL ORGANIC SKELETON/CARBON NANOFIBER MEMBRANE AND PREPARATION METHOD AND APPLICATION THEREOF

(71) Applicant: SOOCHOW UNIVERSITY, Suzhou (CN)

(72) Inventors: Jianmei Lu, Suzhou (CN); Dongyun Chen, Suzhou (CN); Jun Jiang, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 548 days.

(21) Appl. No.: 16/427,053

(22) Filed: May 30, 2019

(65) Prior Publication Data

US 2019/0366319 A1 Dec. 5, 2019

(30) Foreign Application Priority Data

May 31, 2018 (CN) .......................... 201810548592.9

(51) Int. Cl.
*B01J 31/38* (2006.01)
*B01D 53/86* (2006.01)
(Continued)

(52) U.S. Cl.
CPC .......... *B01J 31/38* (2013.01); *B01D 53/8678* (2013.01); *B01J 35/004* (2013.01); *B01J 35/065* (2013.01);
(Continued)

(58) Field of Classification Search
CPC ........ B01J 21/185; B01J 31/38; B01J 35/004; B01J 35/065; B01J 37/0219;
(Continued)

(56) References Cited

U.S. PATENT DOCUMENTS

| 7,229,944 | B2 * | 6/2007 | Shao-Horn | D01F 1/02 423/447.5 |
| 2003/0165648 | A1 * | 9/2003 | Lobovsky | D01F 1/10 425/131.5 |

(Continued)

OTHER PUBLICATIONS

Derwent Abstract of CN 105413752 A (Year: 2016).*
(Continued)

*Primary Examiner* — Patricia L. Hailey
(74) *Attorney, Agent, or Firm* — SZDC Law P.C.

(57) ABSTRACT

The invention discloses a visible light responsive titanium dioxide nanowire/metal organic skeleton/carbon nanofiber membrane and preparation method and application thereof. A CNF (Carbon Nano Fiber)/$TiO_2$ nano-wire/MIL-100 (represented as CTWM) membrane material is prepared and an MIL-100 material is used for adsorbing waste gas to enhance the photocatalytic effect of titanium dioxide on the membrane material; a CNF/$TiO_2$/MIL-100 membrane catalyst sufficiently utilizes the adsorption capability of MIL-100 on the waste gas, the photocatalytic degradation performance of the $TiO_2$ and high electrical conductivity of CNF to effectively prolong the service life of photoelectrons and promote the photocatalytic activity of the photoelectrons.

17 Claims, 3 Drawing Sheets

(51) Int. Cl.
*B01J 35/00* (2006.01)
*B01J 35/06* (2006.01)
*B01J 37/02* (2006.01)
*B01J 37/04* (2006.01)
*B01J 37/08* (2006.01)

(52) U.S. Cl.
CPC ....... *B01J 37/0219* (2013.01); *B01J 37/0244* (2013.01); *B01J 37/04* (2013.01); *B01J 37/084* (2013.01); *B01D 2255/20707* (2013.01); *B01D 2255/802* (2013.01); *B01D 2258/02* (2013.01)

(58) Field of Classification Search
CPC ....... B01J 37/0244; B01J 37/04; C01B 32/16; C01B 32/166; B01D 53/8678; B01D 2255/20707; B01D 2255/802; B01D 2258/02
USPC ............ 502/350; 264/433, 634, 638, 172.17, 264/206; 977/742, 762, 842, 882
See application file for complete search history.

(56) References Cited

U.S. PATENT DOCUMENTS

| | | | |
|---|---|---|---|
| 2010/0247909 A1* | 9/2010 | Lee | D01F 9/14 423/447.2 |
| 2013/0184144 A1* | 7/2013 | Liang | H01L 21/00 977/734 |
| 2015/0076742 A1* | 3/2015 | Joo | D01D 1/02 264/433 |
| 2017/0056873 A1* | 3/2017 | Jones | B01J 31/38 |

OTHER PUBLICATIONS

S. K. Niataraj et al., "Free Standing Thin Webs of Porous Carbon Nanofibers of Polyacrylonitrile Containing Iron-Oxide by Electrospinning," Materials Letters, vol. 63, No. 2, pp. 218-220. (Year: 2008).*

* cited by examiner

VISIBLE LIGHT RESPONSIVE TITANIUM DIOXIDE NANOWIRE/METAL ORGANIC SKELETON/CARBON NANOFIBER MEMBRANE AND PREPARATION METHOD AND APPLICATION THEREOF

This application claims priority to Chinese Patent Application No.: 201810548592.9, filed on May 31, 2018, which is incorporated by reference for all purposes as if fully set forth herein.

FIELD OF THE INVENTION

The present invention belongs to the technical field of functional materials, and particularly relates to a preparation method of a titanium dioxide nanowire/metal organic skeleton/carbon nanofiber membrane and its application in the treatment of exhaust gas.

TECHNICAL BACKGROUND

With the rapid development of industry, the problem of industrial emissions of exhaust gases have become increasingly serious. Because the exhaust gas is highly toxic, corrosive and flammable, it can seriously threaten the ecological environment and human health. At present, photocatalytic technology has the advantages of non-toxicity, high degradation efficiency and strong redox ability, and is considered to be one of the most economical and effective methods for reducing various exhaust gas pollution.

Titanium dioxide ($TiO_2$) can be used for catalytic degradation of some typical toxic exhaust gases at low concentrations and exhibits significant catalytic degradation effect. However, the rapid recombination of photogenerated electron-hole pairs of $TiO_2$ and the utilization of visible light are inefficient. Therefore, by changing the morphology of $TiO_2$, the specific surface area can be increased, the ability to adsorb exhaust gas can be improved, and the photocatalytic efficiency can be improved. On the other hand, different modification methods, such as doping of transition metal ions, coupling with other semiconductors, etc, can also be used to further improve photocatalytic activity. However, the prior art has problems such as poor improvement effect and complicated preparation.

SUMMARY OF THE INVENTION

The object of the present invention is to provide an inorganic functional material capable of responsive to visible light and catalytic degradation of exhaust gas. The prepared CNF/$TiO_2$ nanowire/MIL-100 (expressed as CTWM) membrane material utilizes the adsorption of exhaust gas by MIL-100 material to enhance the photocatalytic effect of titanium dioxide.

In order to achieve the above object, the present invention provides a preparation method as follows:

A preparation method of a visible light responsive titanium dioxide nanowires/metal organic skeleton/carbon nanofiber membrane (CNF/$TiO_2$/MIL-100, denoted as CTWM), including the following steps:

(1) preparing polyacrylonitrile (PAN) nanofibers by electrospinning, and then carbonizing said polyacrylonitrile nanofibers under an inert atmosphere to obtain carbon nanofibers (CNF);

(2) adding cetyltrimethyl ammonium bromide (CTAB) solution into tetramethylammonium titanate (TTIP) solution and stirring, adding ethylene glycol (EG) and urea, stirring to obtain a mixed solution; immersing said carbon nanofibers in the mixed solution and heating, after reaction, it is naturally cooled to room temperature to obtain a titanium dioxide nanowires/carbon nanofiber membrane;

(3) immersing the titanium dioxide nanowires/carbon nanofiber membrane in ethanol, adding (3-aminopropyl) triethoxysilane and stirring at room temperature to obtain a treated titanium dioxide nanowires/carbon nanofiber membrane; then transferring the treated titanium dioxide nanowires/carbon nanofiber membrane into DMF containing succinic anhydride, stirring to form a carboxylate-terminated titanium dioxide nanowires/carbon nanofiber membrane;

(4) using a $FeCl_3.6H_2O$ solution and a trimesic acid ($H_3btc$) solution as the assembly liquid, the metal organic skeleton is supported on the carboxylate-terminated titanium dioxide nanowires/carbon nanofiber membrane by a layer-by-layer self-assembly method to obtain a titanium dioxide nanowires/metal organic skeleton/carbon nanofiber membrane.

The present invention also disclosed a preparation method of a carboxylate-terminated titanium dioxide nanowires/carbon nanofiber membrane, including the following steps:

(1) preparing polyacrylonitrile (PAN) nanofibers by electrospinning, and then carbonizing said polyacrylonitrile nanofibers under an inert atmosphere to obtain carbon nanofibers (CNF);

(2) adding cetyltrimethyl ammonium bromide (CTAB) solution into tetramethylammonium titanate (TTIP) solution and stirring, adding ethylene glycol (EG) and urea, stirring to obtain a mixed solution; immersing said carbon nanofibers in the mixed solution and heating, after reaction, it is naturally cooled to room temperature to obtain a titanium dioxide nanowires/carbon nanofiber membrane;

(3) immersing the titanium dioxide nanowires/carbon nanofiber membrane in ethanol, adding (3-aminopropyl) triethoxysilane and stirring at room temperature to obtain a treated titanium dioxide nanowires/carbon nanofiber membrane; then transferring the treated titanium dioxide nanowires/carbon nanofiber membrane into DMF containing succinic anhydride, stirring to form a carboxylate-terminated titanium dioxide nanowires/carbon nanofiber membrane.

The present invention also discloses a preparation method of a treated titanium dioxide nanowires/carbon nanofiber membrane, including the following steps:

(1) preparing polyacrylonitrile (PAN) nanofibers by electrospinning, and then carbonizing said polyacrylonitrile nanofibers under an inert atmosphere to obtain carbon nanofibers (CNF);

(2) adding cetyltrimethyl ammonium bromide (CTAB) solution into tetramethylammonium titanate (TTIP) solution and stirring, adding ethylene glycol (EG) and urea, stirring to obtain a mixed solution; immersing said carbon nanofibers in the mixed solution and heating, after reaction, it is naturally cooled to room temperature to obtain a titanium dioxide nanowires/carbon nanofiber membrane;

(3) immersing the titanium dioxide nanowires/carbon nanofiber membrane in ethanol, adding (3-aminopropyl) triethoxysilane and stirring at room temperature to obtain a treated titanium dioxide nanowires/carbon nanofiber membrane.

In the above technical solution, in step (1), the concentration of the PAN solution is 0.05 g/mL~0.4 g/mL, the electrospinning voltage is 10~20 kV, the injection rate is 0.15~0.25 mm/min, and the carbonization temperature is 400~600° C., the heating rate is 1~3 K/min.

In step (2), the solvent of cetyltrimethyl ammonium bromide (CTAB) solution is water, the solvent in TTIP solution is HCl solution; The ratio of the amount of CTAB, TTIP, EG and urea is (0.1~0.3 g):(0.05~0.25 g):(30~60 mL):(10~100 mg).

In step (2), the reaction temperature is 150~200° C., the reaction time is 12~20 h.

In step (3), the volume ratio of ethanol to 3-aminopropyltriethoxysilane is (10~50):(0.5~2); In DMF containing succinic anhydride, the concentration of succinic anhydride is 1~5 M.

In step (4), the layer-by-layer self-assembly method comprises the steps of immersing a carboxylate-terminated titanium dioxide nanowire/carbon nanofiber membrane in a hexahydrate ferric chloride solution and a polytrimethylene solution successively to complete an assembly; the carboxylate-terminated CNFs/$TiO_2$ nanowires membrane is assembled in multiple times to obtain a CNF/$TiO_2$/MIL-100 membrane.

In step (4), the concentration of $FeCl_3$ in $FeCl_3 \cdot 6H_2O$ ethanol solution is 1~10 mM; the concentration of $H_3$btc in $H_3$btc ethanol solution is 1~10 mM.

The invention also discloses a visible light responsive titanium dioxide nanowire/metal organic skeleton/carbon nanofiber membrane prepared according to the above preparation method, a carboxylate-terminated titanium dioxide nanowires/carbon nanofiber membrane, and a treated titanium dioxide nanowires/carbon nanofiber membrane.

The invention adopts simple solvothermal method and a layer-by-layer self-assembly method to successfully prepare a CNF/$TiO_2$/MIL-100 membrane photocatalyst, and realizes wide application in degrading exhaust gas pollution. Accordingly, the present invention further discloses the use of such a membrane photocatalyst for degrading exhaust gas.

The invention further discloses a method for photocatalytic degradation of exhaust gas, including the following steps:

(1) preparing polyacrylonitrile (PAN) nanofibers by electrospinning, and then carbonizing said polyacrylonitrile nanofibers under an inert atmosphere to obtain carbon nanofibers (CNF);

(2) adding cetyltrimethyl ammonium bromide (CTAB) solution into tetramethylammonium titanate (TTIP) solution and stirring, adding ethylene glycol (EG) and urea, stirring to obtain a mixed solution; immersing said carbon nanofibers in the mixed solution and heating, after reaction, it is naturally cooled to room temperature to obtain a titanium dioxide nanowires/carbon nanofiber membrane;

(3) immersing the titanium dioxide nanowires/carbon nanofiber membrane in ethanol, adding (3-aminopropyl)triethoxysilane and stirring at room temperature to obtain a treated titanium dioxide nanowires/carbon nanofiber membrane; then transferring the treated titanium dioxide nanowires/carbon nanofiber membrane into DMF containing succinic anhydride, stirring to form a carboxylate-terminated titanium dioxide nanowires/carbon nanofiber membrane;

(4) using a $FeCl_3 \cdot 6H_2O$ solution and a trimesic acid ($H_3$btc) solution as the assembly liquid, the metal organic skeleton is supported on the carboxylate-terminated titanium dioxide nanowires/carbon nanofiber membrane by a layer-by-layer self-assembly method to obtain a titanium dioxide nanowires/metal organic skeleton/carbon nanofiber membrane;

(5) letting the exhaust gas pass through the titanium dioxide nanowires/metal organic skeleton/carbon nanofiber membrane, and the photocatalytic degradation of the exhaust gas is completed under illumination.

In the above technical solution, the photocatalysis is ultraviolet photocatalysis, and the photocatalytic time is 150 min.

The titanium dioxide nanowires/metal organic skeleton/carbon nanofiber membrane disclosed in the present invention can be prepared as follows:

(1) Synthesis of Carbon Nanofibers (CNFs)

Polyacrylonitrile (PAN) nanofibers are prepared by an electrospinning technique. a certain amount of PAN is dissolved in the N,N-dimethylformamide (DMF) under stirring and the solution is transferred into 5 mL plastic syringe for electrospinning at a certain voltage and injection rate. Then, the obtained PAN nanofibers are carbonized under an inert atmosphere to get CNFs with a certain carbonization temperature and a heating rate.

(2) Synthesis of CNFs/$TiO_2$ Nanowires (CTW) Membrane

The CTW membrane is synthesized by a one-step hydrothermal method. Briefly, the TTIP is added into HCl solution (37 wt. %) to form the TTIP solution under vigorous stirring. In a separate vessel, the aqueous CTAB solution is obtained by adding the CTAB into the distilled water and stirring. The CTAB solution is added into the TTIP solution and then stirred to form an aqueous TTIP solution. The obtained aqueous TTIP solution are added with EG and urea and kept stirring. The CNFs are then immersed in the solution, and then it is transferred to a 50 mL autoclave and heated in a homogeneous reactor for a while. After naturally cooling to room temperature, the obtained CNFs/$TiO_2$ nanowires (CTW) membrane is ished with distilled water and dried in an oven.

(3) Synthesis of CNF/$TiO_2$/MIL-100 (CTWM) Membrane

The obtained CNFs/$TiO_2$ nanowires (CTW) membrane is immersed in the $C_2H_5OH$ and (3-aminopropyl)triethoxysilane is added gradually and stirred at room temperature. The membrane is then transferred to the DMF, which contained succinic anhydride. The mixture is then stirred for a further to form the carboxylate-terminated $TiO_2$ nanowires. After ishing several times with $C_2H_5OH$, the MOF shell is loaded by a versatile step-by-step assembly procedure. The freshly prepared carboxylate-terminated membrane is immersed in the $FeCl_3 \cdot 6H_2O$ ethanol solution. After the mixture is stirred at room temperature, the membrane is transferred to the $H_3$btc ethanol solution and it is stirred at room temperature. The product is ished several times with $C_2H_5OH$. After repeating the above steps several times, and the product is dried in an oven.

In step (1), the amount of the PAN is 0.5~2 g, the volume of the N,N-dimethylformamide (DMF) is 5~10 mL, the stirring time is 5~15 h, the electrospinning voltage is 10~20 kV, the injection rate is 0.15~0.25 mm/min, and the carbonization temperature is 400~600° C., the heating rate is 1~3 K/min.

In step (2), the amount of TTIP is 0.1~0.3 g, the amount of HCl solution (37 wt %) is 5~10 g, the amount of CTAB is 0.05~0.25 g, and the volume of distilled water is 10~20 mL. The volume of TTIP aqueous solution is 5~15 mL, the volume of EG is 30~60 mL, the dosage of urea is 0.5~1.5 g, the dosage of CNFs is 10~100 mg, the reaction temperature is 150~200° C., the reaction time is 12~20 h, and the drying temperature is 30~80° C.

In step (3), the volume of EtOH is 10~50 mL, the volume of 3-aminopropyltriethoxysilane is 0.5~2 mL, the stirring time is 0.5~10 h, the amount of succinic anhydride is 0.1~0.5 g, the volume of $FeCl_3 \cdot 6H_2O$ ethanol solution is 10~40 mL, the concentration of $FeCl_3 \cdot 6H_2O$ ethanol solution is 1~10 mM, the volume of $H_3$btc ethanol solution is 10~50 mL, the concentration of $H_3$btc ethanol solution is 1~10 mM, and the drying temperature is 30~80° C.

The present invention has the advantages as followed:

(1) The invention adopts simple hydrothermal method and a layer-by layer self-assembly method to obtain a CNF/$TiO_2$/MIL-100 membrane photocatalyst, which has simple preparation process and abundant material sources, is favorable for reducing preparation cost, and easy to realize mass production.

(2) The CNF/$TiO_2$/MIL-100 membrane photocatalyst can fully utilize the adsorption capacity of MIL-100 for exhaust gas, the photocatalytic degradation performance of $TiO_2$, and the high conductivity of CNF, effectively increasing the lifetime of photogenerated electrons and promoting its photocatalytic activity.

DETAILED DESCRIPTION OF THE INVENTION

The present invention will be further described below in conjunction with the specific implementation methods. In this invention, metal-organic frameworks (MOFs), consisting of polyfunctional organic ligands linking multiple metal ions, have attracted great interest because of their excellent applications in adsorpting a variety of exhaust gases resulting from their porosity, high surface area, and chemical tenability. Moreover, as low cost, eco-friendly, chemically and physically stable, and highly conductive one-dimensional materiasl, using CNFs as a catalyst carrier can be helpful to ensure uniform growth of nanostructured materials and to construct hierarchical structures. Simultaneously, highly conductive long CNFs have the further advantage of providing a conducting pathway to capture and transport photoinduced electrons, which have been widely used in Li-ion batteries, supercapacitors, and photocatalysts.

Implementation 1

Polyacrylonitrile (PAN) nanofibers were prepared by an electrospinning technique. 1 g of PAN was dissolved in 9 mL of N,N-dimethylformamide (DMF) under stirring and the solution was transferred into 5 mL plastic syringe for electrospinning (injection rate, 0.25 mm/min; voltage, 15 kV). Then, the obtained PAN nanofibers were carbonized at 500° C. for 4 h with a heating rate of 2 K/min under an inert atmosphere to get CNFs.

Figure 1:
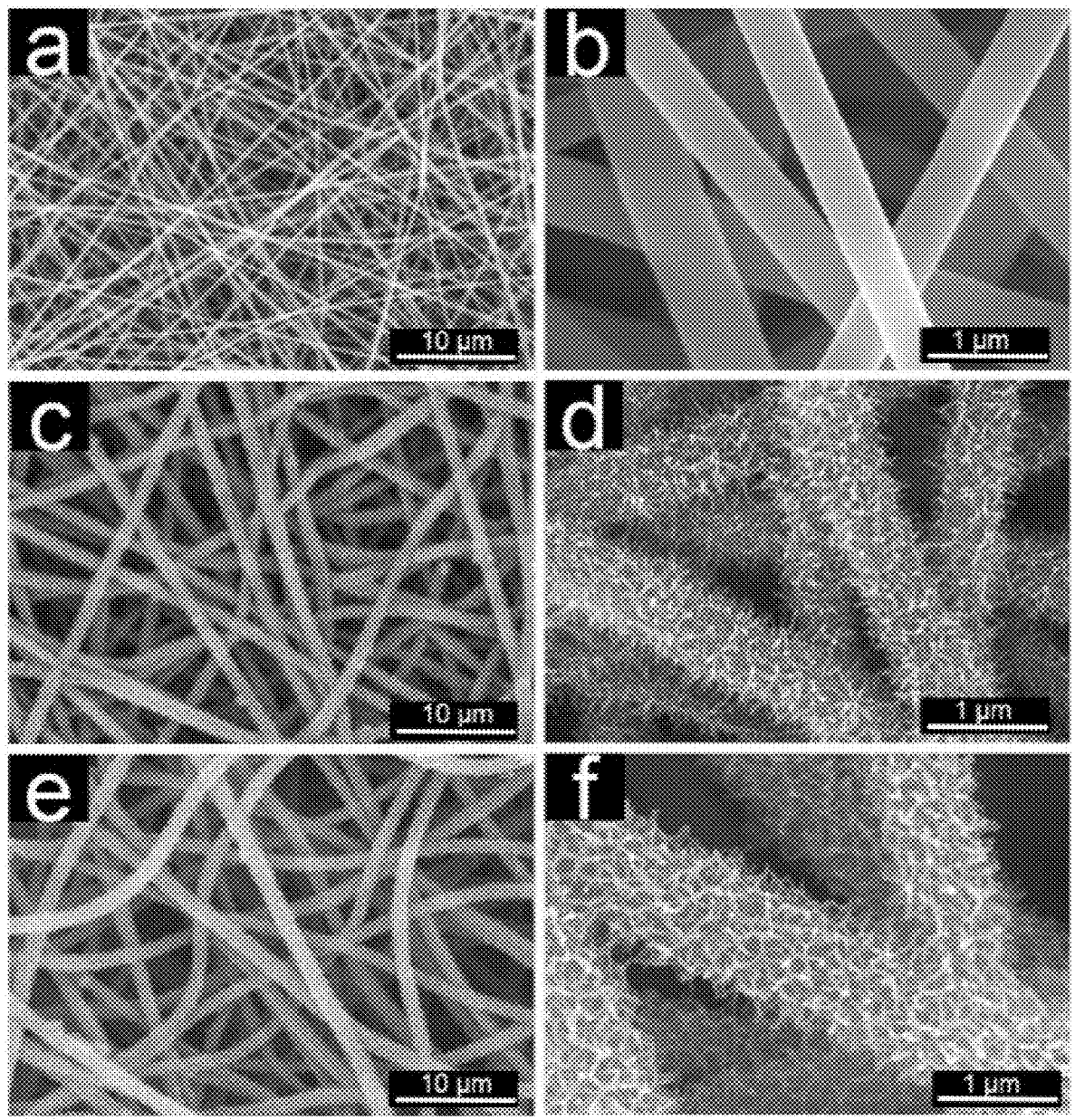
FIG. 1 shows SEM images of CNF, CNF/$TiO_2$ and CNF/$TiO_2$/MIL-100 membrane.

In order to observe the morphology of carbon nanofibers (CNF), the products prepared in this implementation were characterized by SEM. FIG. 1 is the SEM images of carbon nanofibers (CNF) prepared in this implementation, (a) and (b) show the carbon nanofibers (CNF) prepared in this implementation.

Implementation 2

The CNF/$TiO_2$ (CTW) membrane was synthesized by a one-step hydrothermal method. Briefly, 0.14 g TTIP was added into 6.9 g HCl solution (37 wt. %) to form the TTIP solution under vigorous stirring. In a separate vessel, the aqueous CTAB solution was obtained by adding 0.11 g CTAB into 13.8 mL distilled water and stirring for 30 min. The CTAB solution was added into the TTIP solution and then stirred for 1 h to form an aqueous TTIP solution. 9.37 mL obtained aqueous TTIP solution were added 56.25 mL of EG and 0.9 g of urea and kept stirring for 1 h. The CNFs (50 mg) were then immersed in the solution, and then it was transferred to a 50 mL autoclave and heated in a homogeneous reactor at 150° C. for 20 h. The obtained CNFs/$TiO_2$ nanowires (CTW) membrane was washed with distilled water and dried in an oven at 70° C.

In order to observe the morphology of CNF/$TiO_2$ membrane, the products prepared in this implementation were characterized by SEM. FIG. 1 is the SEM images of CNF/$TiO_2$ membrane prepared in this implementation, (c) and (d) show the CNF/$TiO_2$ membrane prepared in this implementation.

Implementation 3

The obtained CNFs/$TiO_2$ nanowires (CTW) membrane was immersed in 20 mL $C_2H_5OH$ and 1 mL of (3-aminopropyl)triethoxysilane was added gradually and stirred at room temperature for 6 h. The membrane was then transferred to 30 mL of DMF, which contained 0.45 g succinic anhydride. The mixture was then stirred for a further 8 h to form the carboxylate-terminated $TiO_2$ nanowires. After washing several times with $C_2H_5OH$, the MOF shell was loaded by a versatile step-by-step assembly procedure. The freshly prepared carboxylate-terminated membrane was immersed in 30 mL of $FeCl_3.6H_2O$ ethanol solution (5 mM). After the mixture was stirred for 15 min at room temperature, the membrane was transferred to 30 mL of $H_3$btc ethanol solution (5 mM) and it was stirred for a further 30 min at 25° C. The product was washed several times with $C_2H_5OH$. This step was repeated five times, and then the product was dried in an oven at 70° C.

Figure 2:
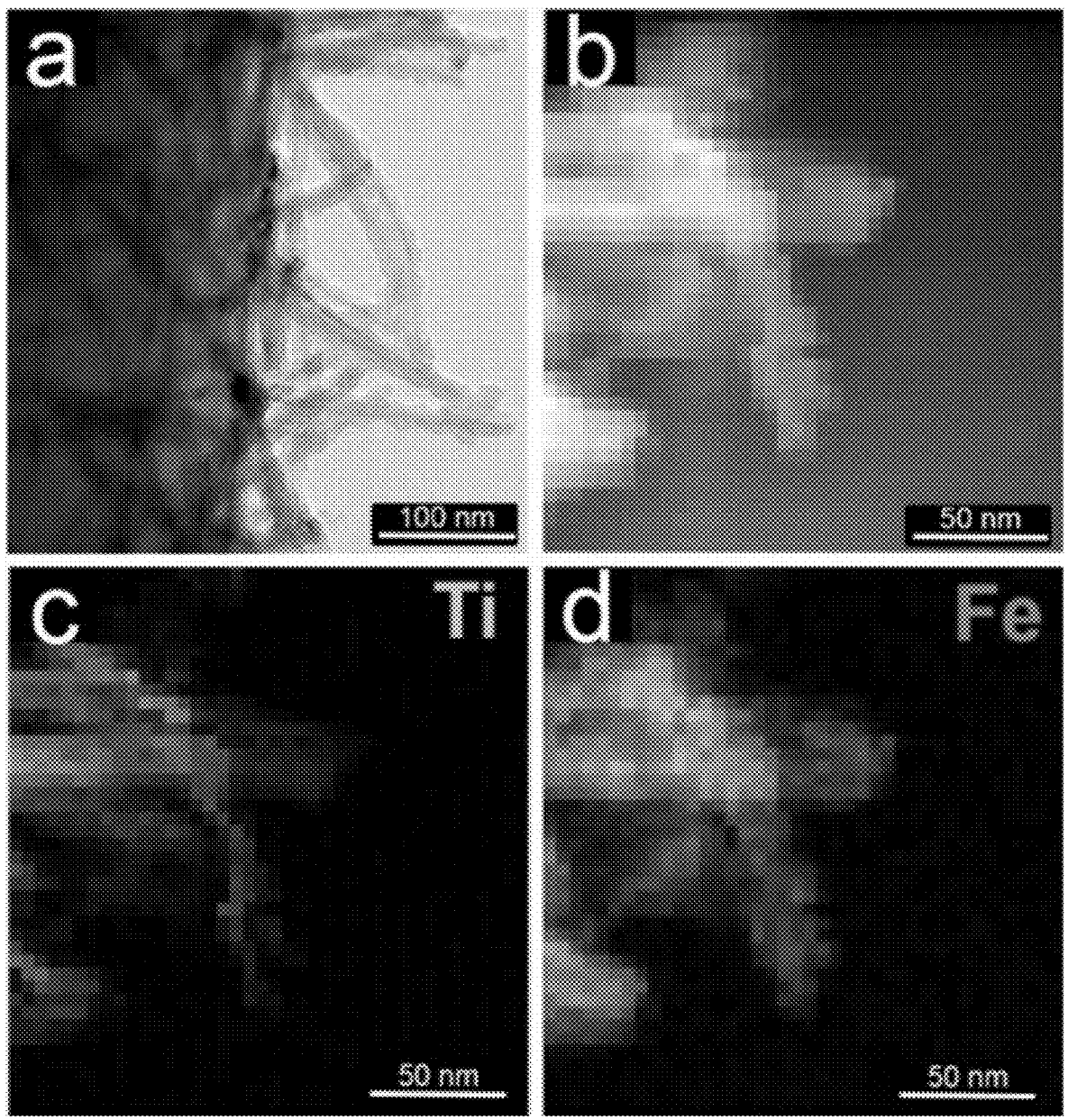
FIG. 2 shows TEM images of CNF/$TiO_2$/MIL-100 membrane.

In order to observe the morphology of CNF/$TiO_2$/MIL-100 membrane, the products prepared in this implementation were characterized by SEM and TEM. FIG. 1 is the SEM images of CNF/$TiO_2$/MIL-100 membrane prepared in this implementation, (e) and (f) show the CNF/$TiO_2$/MIL-100 membrane prepared in this implementation. FIG. 2 is the TEM images of CNF/$TiO_2$/MIL-100 membrane prepared in this implementation, (a) shows a high-power TEM of the CNF/$TiO_2$/MIL-100 membrane prepared in in this implementation, and (b) shows a partially enlarged high-power TEM image of the CNF/$TiO_2$/MIL-100 membrane prepared in this implementation, (c) and (d) shows an elemental analysis diagram of the CNF/$TiO_2$/MIL-100 membrane prepared in this implementation, it can be seen that the Ti and Fe elements were correspond to the main elemental composition of $TiO_2$ and MIL-100, respectively, indicating the successful preparation of the CNF/$TiO_2$/MIL-100 membrane.

Implementation 4

Figure 3:
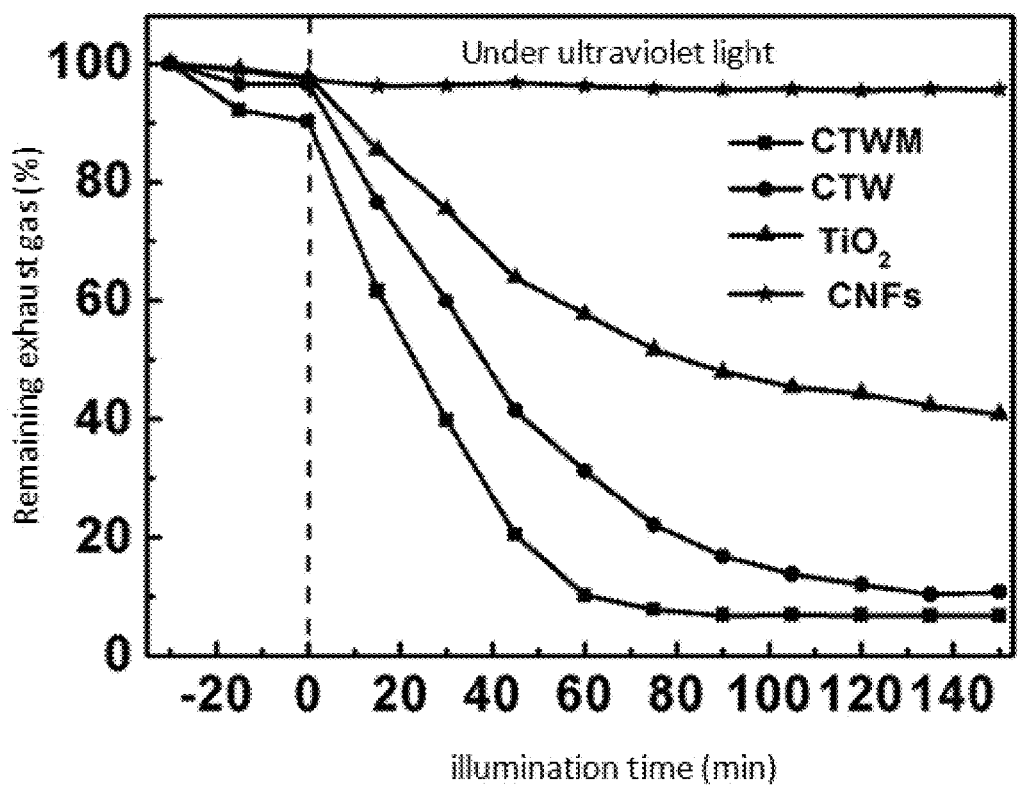
FIG. 3 shows the photocatalytic degradation curves of exhaust gas with CNF membrane, CNF/$TiO_2$ membrane and CNF/$TiO_2$/MIL-100 membrane.

A 1.5 L batch reactor containing a quartz glass was used for the photocatalytic degradation of the exhaust gas. The prepared CNF/$TiO_2$/MIL-100 (CTWM) membranes were put onto the quartz glass. After the reactor was evacuated, 0.5 L of a mixed gas containing exhaust gas (100 ppm) and nitrogen and 1 L of wet ultra-zero air were introduced into the batch reactor. The reaction was started by switching on the UV light, and the gas chromatograph, equipped with a flame ionization detector, was used to analyse the concentration of exhaust gas. FIG. 3 is the photocatalytic degradation curves of exhaust gas with CNF membrane, CNF/$TiO_2$ membrane and CNF/$TiO_2$/MIL-100 membrane.

Conclusion:

According to the above analysis, the CNF/TiO$_2$/MIL-100 membrane synthesized in this invention has a good photocatalytic degradation effect on the exhaust gas, and it has the advantages of simple experimental process and easy availability of experimental raw materials. Therefore, the CNF/TiO$_2$/MIL-100 membrane has application prospects in the treatment of exhaust gas.

We claim:

1. A preparation method of a visible light responsive titanium dioxide nanowires/metal organic skeleton/carbon nanofiber membrane, comprising the following steps:
   (1) preparing polyacrylonitrile nanofibers by electrospinning, and then carbonizing said polyacrylonitrile nanofibers under an inert atmosphere to obtain carbon nanofibers;
   (2) adding cetyltrimethyl ammonium bromide solution into tetramethylammonium titanate solution and stirring, adding ethylene glycol and urea, stirring to obtain a mixed solution;
   immersing said carbon nanofibers in the mixed solution and heating, after reaction, it is naturally cooled to room temperature to obtain a titanium dioxide nanowires/carbon nanofiber membrane;
   (3) immersing the titanium dioxide nanowires/carbon nanofiber membrane in ethanol, adding (3-aminopropyl)triethoxysilane and stirring at room temperature to obtain a treated titanium dioxide nanowires/carbon nanofiber membrane; then transferring the treated titanium dioxide nanowires/carbon nanofiber membrane into DMF containing succinic anhydride, stirring to form a carboxylate-terminated titanium dioxide nanowires/carbon nanofiber membrane;
   (4) using a FeCl$_3$·6H$_2$O solution and a trimesic acid solution as the assembly liquid, the metal organic skeleton is supported on the carboxylate-terminated titanium dioxide nanowires/carbon nanofiber membrane by a layer-by-layer self-assembly method to obtain a titanium dioxide nanowires/metal organic skeleton/carbon nanofiber membrane.

2. The method according to claim 1, wherein in step (1), when preparing polyacrylonitrile nanofibers, the concentration of polyacrylonitrile solution is 0.05 g/mL~0.4 g/mL, the electrospinning voltage is 10~20 kV, the injection rate is 0.15~0.25 mm/min, and the carbonization temperature is 400~600° C., the heating rate is 1~3 K/min.

3. The method according to claim 1, wherein in step (2), the solvent of cetyltrimethyl ammonium bromide solution is water, the solvent in tetramethylammonium titanate solution is HCl solution; the ratio of the amount of cetyltrimethyl ammonium bromide, tetramethylammonium titanate, ethylene glycol and urea is (0.1~0.3 g):(0.05~0.25 g):(30~60 mL):(10~100 mg); the reaction temperature is 150~200° C., the reaction time is 12~20 h.

4. The method according to claim 1, wherein in step (3), the volume ratio of ethanol to (3-aminopropyl)triethoxysilane_is (10~50):(0.5~2); in DMF containing succinic anhydride, the concentration of succinic anhydride is 1~5 M.

5. The method according to claim 1, wherein in step (4), the layer-by-layer self-assembly method comprises the steps of immersing a carboxylate-terminated titanium dioxide nanowire/carbon nanofiber membrane in a hexahydrate ferric chloride solution and a polytrimethylene solution successively to complete an assembly; the carboxylate-terminated titanium dioxide nanowires/carbon nanofiber membrane is assembled in multiple times to obtain a titanium dioxide nanowires/metal organic skeleton/carbon nanofiber membrane; the concentration of FeCl$_3$ in FeCl$_3$·6H$_2$O ethanol solution is 1~10 mM; the concentration of trimesic acid in trimesic acid ethanol solution is 1~10 mM.

6. A visible light responsive titanium dioxide nanowire/metal organic skeleton/carbon nanofiber membrane prepared by the preparation method according to claim 1.

7. A preparation method of a treated titanium dioxide nanowires/carbon nanofiber membrane, comprising the following steps:
   (1) preparing polyacrylonitrile nanofibers by electrospinning, and then carbonizing said polyacrylonitrile nanofibers under an inert atmosphere to obtain carbon nanofibers;
   (2) adding cetyltrimethyl ammonium bromide solution into tetramethylammonium titanate solution and stirring, adding ethylene glycol and urea, stirring to obtain a mixed solution;
   immersing said carbon nanofibers in the mixed solution and heating, after reaction, it is naturally cooled to room temperature to obtain a titanium dioxide nanowires/carbon nanofiber membrane;
   (3) immersing the titanium dioxide nanowires/carbon nanofiber membrane in ethanol, adding (3-aminopropyl)triethoxysilane and stirring at room temperature to obtain a treated titanium dioxide nanowires/carbon nanofiber membrane.

8. The method according to claim 7, further comprising: transferring the treated titanium dioxide nanowires/carbon nanofiber membrane into DMF containing succinic anhydride, stirring to form a carboxylate-terminated titanium dioxide nanowires/carbon nanofiber membrane.

9. The method according to claim 7, wherein in step (1), when preparing polyacrylonitrile nanofibers, the concentration of polyacrylonitrile solution is 0.05 g/mL~0.4 g/mL, the electrospinning voltage is 10~20 kV, the injection rate is 0.15~0.25 mm/min, and the carbonization temperature is 400~600° C., the heating rate is 1~3 K/min.

10. The method according to claim 7, wherein in step (2), the solvent of cetyltrimethyl ammonium bromide solution is water, the solvent in tetramethylammonium titanate solution is HCl solution; The ratio of the amount of cetyltrimethyl ammonium bromide, tetramethylammonium titanate, ethylene glycol and urea is (0.1~0.3 g):(0.05~0.25 g):(30~60 mL):(10~100 mg); the reaction temperature is 150~200° C., the reaction time is 12~20 h.

11. The method according to claim 7, wherein in step (3), the volume ratio of ethanol to 3-aminopropyltriethoxysilane is (10~50):(0.5~2); in DMF containing succinic anhydride, the concentration of succinic anhydride is 1~5 M.

12. The method according to claim 7, wherein in step (4), the layer-by-layer self-assembly method comprises the steps of immersing a carboxylate-terminated titanium dioxide nanowire/carbon nanofiber membrane in a hexahydrate ferric chloride solution and a polytrimethylene solution successively to complete an assembly; the carboxylate-terminated titanium dioxide nanowires/carbon nanofiber membrane is assembled in multiple times to obtain a titanium dioxide nanowires/metal organic skeleton/carbon nanofiber membrane; the concentration of FeCl$_3$ in FeCl$_3$·6H$_2$O ethanol solution is 1~10 mM; the concentration of trimesic acid in trimesic acid ethanol solution is 1~10 mM.

13. A method for photocatalytic degradation of exhaust gas, comprising the following steps:

(1) preparing polyacrylonitrile nanofibers by electrospinning, and then carbonizing said polyacrylonitrile nanofibers under an inert atmosphere to obtain carbon nanofibers;

(2) adding cetyltrimethyl ammonium bromide solution into tetramethylammonium titanate solution and stirring, adding ethylene glycol and urea, stirring to obtain a mixed solution;

immersing said carbon nanofibers in the mixed solution and heating, after reaction, it is naturally cooled to room temperature to obtain a titanium dioxide nanowires/carbon nanofiber membrane;

(3) immersing the titanium dioxide nanowires/carbon nanofiber membrane in ethanol, adding (3-aminopropyl)triethoxysilane and stirring at room temperature to obtain a treated titanium dioxide nanowires/carbon nanofiber membrane; then transferring the treated titanium dioxide nanowires/carbon nanofiber membrane into DMF containing succinic anhydride, stirring to form a carboxylate-terminated titanium dioxide nanowires/carbon nanofiber membrane;

(4) using a $FeCl_3 \cdot 6H_2O$ solution and a trimesic acid ($H_3btc$) solution as the assembly liquid, the metal organic skeleton is supported on the carboxylate-terminated titanium dioxide nanowires/carbon nanofiber membrane by a layer-by-layer self-assembly method to obtain a titanium dioxide nanowires/metal organic skeleton/carbon nanofiber membrane;

(5) letting the exhaust gas pass through the titanium dioxide nanowires/metal organic skeleton/carbon nanofiber membrane, and the photocatalytic degradation of the exhaust gas is completed under illumination.

14. The method according to claim 13, wherein in step (1), when preparing polyacrylonitrile nanofibers, the concentration of polyacrylonitrile solution is 0.05 g/mL~0.4 g/mL, the electrospinning voltage is 10~20 kV, the injection rate is 0.15~0.25 mm/min, and the carbonization temperature is 400~600° C., the heating rate is 1~3 K/min.

15. The method according to claim 13, wherein in step (2), the solvent of cetyltrimethyl ammonium bromide solution is water, the solvent in tetramethylammonium titanate solution is HCl solution; The ratio of the amount of cetyltrimethyl ammonium bromide, tetramethylammonium titanate, ethylene glycol and urea is (0.1~0.3 g):(0.05~0.25 g):(30~60 mL):(10~100 mg); the reaction temperature is 150~200° C., the reaction time is 12~20 h.

16. The method according to claim 13, wherein in step (3), the volume ratio of ethanol to 3-aminopropyltriethoxysilane is (10~50):(0.5~2); in DMF containing succinic anhydride, the concentration of succinic anhydride is 1~5 M.

17. The method according to claim 13, wherein in step (4), the layer-by-layer self-assembly method comprises the steps of immersing a carboxylate-terminated titanium dioxide nanowire/carbon nanofiber membrane in a hexahydrate ferric chloride solution and a polytrimethylene solution successively to complete an assembly; the carboxylate-terminated titanium dioxide nanowires/carbon nanofiber membrane is assembled in multiple times to obtain a titanium dioxide nanowires/metal organic skeleton/carbon nanofiber membrane; the concentration of $FeCl_3$ in $FeCl_3 \cdot 6H_2O$ ethanol solution is 1~10 mM; the concentration of trimesic acid in trimesic acid ethanol solution is 1~10 mM.

* * * * *